United States Patent [19]

Alexander et al.

[11] Patent Number: 4,524,192

[45] Date of Patent: Jun. 18, 1985

[54] FLEXIBLE COATING COMPOSITIONS

[76] Inventors: Delores J. Alexander, 29060 Lone Elm La., Southfield, Mich. 48076; Kenneth R. Kurple, 9533 Springborn Rd., Anchorville, Mich. 48004; Panagiotis I. Kordomenos, 42758 Elizabeth Cir., Mt. Clemens, Mich. 48044

[21] Appl. No.: 553,322

[22] PCT Filed: Oct. 13, 1983

[86] PCT No.: PCT/US83/01596

§ 371 Date: Oct. 13, 1983

§ 102(e) Date: Oct. 13, 1983

[87] PCT Pub. No.: WO85/01694

PCT Pub. Date: Apr. 25, 1985

[51] Int. Cl.$^3$ .................. C08L 75/06; C08L 67/02
[52] U.S. Cl. .................................. 525/440; 427/409; 427/412.5; 428/423.7; 428/425.3; 524/539; 525/443; 525/456
[58] Field of Search ............... 525/440, 443, 456, 457; 528/60, 85; 427/409, 412.5; 428/423.3, 425.3

[56]     References Cited
U.S. PATENT DOCUMENTS

| | | | |
|---|---|---|---|
| 3,763,079 | 10/1973 | Fryd | 260/37 N |
| 3,882,189 | 5/1975 | Hudak | 260/850 |
| 3,954,899 | 5/1976 | Chang et al. | 260/849 |
| 3,962,522 | 6/1976 | Chang et al. | 428/423 |
| 4,017,456 | 4/1977 | Tucker et al. | 260/45.9 R |
| 4,021,505 | 5/1977 | Wang | 525/443 |
| 4,034,017 | 7/1977 | Chang et al. | 260/859 R |
| 4,205,115 | 5/1980 | Piccirilli et al. | 428/334 |
| 4,208,495 | 6/1980 | Chang et al. | 525/440 |

Primary Examiner—Theodore E. Pertilla
Attorney, Agent, or Firm—Lorraine S. Melotik; Roger L. May

[57]     ABSTRACT

This invention is directed to flexible coating compositions which have excellent adherence to metal and plastic substrates and possess superior weathering properties. The composition comprises hydroxy-containing urethane modified polyesters, amine-aldehyde crosslinking agent and, optionally, high molecular weight linear urethanes. The polyesters are made by reacting urethane modified diol with polyol and acid component.

19 Claims, No Drawings

FLEXIBLE COATING COMPOSITIONS

Reference is made to concurrently filed and commonly assigned related U.S. applications Ser. No. 555,463 entitled "Flexible Basecoat/Two Component Clear Coat Coating Compositions", abandoned in favor of application Ser. No. 615,700 filed May 29, 1984, U.S. application Ser. No. 558,399 entitled "Flexible Two Component Urethane Coating Compositions", U.S. application Ser. No. 598,551 entitled "Flexible Uni-Basecoat/Two Component Clearcoat Coating Compositions", all to Kordomenos et al, and U.S. application Ser. No. 592,124 entitled "Flexible Basecoat/Clearcoat Coating Compositions", to Alexander et al.

TECHNICAL FIELD

This invention relates to flexible coating compositions which have excellent adherence to metal or plastic and possess superior weathering properties. This composition can be employed as a single coating, in combination with other coatings, or can be used for each coat of a basecoat/clearcoat system. More particularly, the invention relates to coating compositions which comprise hydroxy-containing urethane modified polyester made from urethane modified diols reacted with polyol and diacid, amine-aldehyde crosslinker, and, optionally, a high molecular weight linear polyurethane.

BACKGROUND ART

Recently, there has been interest in the use of rubbery, resilient materials for areas which are subject to mechanical shock such as automobile bumpers, moldings and front ends. The use of such materials aids in providing protection from permanent structural damage but, in order to attain the desired appearance, a protective coating must have unique properties, such as a high degree of extensibility, impact resistance, resistance to cracking under severe environmental conditions, such as exposure to low temperature and low humidity. Conventional coatings, including those employed on rubber and similar extensible objects heretofore, do not have the required combination of properties. Generally compositions that are flexible enough to be applied over both metal and plastic substrates have rather poor weatherability and overall durability.

U.S. Pat. No. 3,882,189 and U.S. Pat. No. 3,962,522 are exemplary of numerous patents which describe flexible coating compositions wherein the resin comprises polyurethane modified polyesters formed by reacting polyisocyanate with polyester polyols. These resins are cured with amine aldehyde crosslinkers. It is taught therein, that the presence of the urethane groups in the polymer significantly contributes to the flexibility as well as improved weathering properties, gloss, and abrasion resistance of the coating. However, while it is thus desirable to employ a substantial number of urethane groups in these resins, the amount which may be included in these types of resins is limited. When hydroxy polyester resin is reacted with polyisocyanate it has a tendency to form a gelled mass and thus the amount of polyisocyanate that may be employed must be restricted in order to avoid gelation. Still further, these urethane linkages are added in a latter modification of the polyester polyol reaction product, rather than being incorporated into the backbone of the resin.

DISCLOSURE OF THE INVENTION

This invention is directed to flexible coating compositions which are suitable for use over various substrates. The compositions may be used over rubbery, resilient materials as well as over metal. The coating composition of this invention is characterized in that it comprises:

(A) hydroxy-containing urethane modified polyester (i) having a number average molecular weight ($\overline{M}_n$) of between about 1000 and about 10,000, (ii) having a hydroxyl number of between about 30 and about 200, and (iii) containing between about 1 and about 10 urethane groups per molecule, and being made from reactants comprising:
  (1) urethane modified diol made by reacting:
    (a) diol, and
    (b) diisocyanate,
    wherein the diol and diisocyanate are reacted in a molar ratio of from about 4:1 to about 4:3;
  (2) polyol comprising at least about 5 weight percent triol; and
  (3) acid component selected from dicarboxylic acids and anhydrides thereof;
(B) amine-aldehyde crosslinking agent; and
(C) 0–60 weight percent, based on the total weight of (A) and (B), of a linear polyurethane having a number average molecular weight between about 15,000 and about 40,000, preferably of between about 20,000 and about 30,000.

These flexible coating compositions may also be employed as the basecoat composition and clearcoat composition of basecoat/clearcoat systems. In such systems, the clearcoat composition is in film adherence to the basecoat composition that is in adherence to a substrate. Still further, these coating compositions may be employed as a primer.

Advantageously, the flexible coatings of the invention of this application possess superior weathering properties as well as excellent adhesion to metal and plastic, thus making them well suited for use as coatings on various car components. In forming the modified polyester of the coatings of the invention of this application, the urethane linkages are advantageously incorporated into the backbone of the modified polyester, since they are formed in an initial reaction of diisocyanate with diol, rather than being incorporated into the polyester resin in a later reaction step as is done when forming prior art urethane polyester resins. It has now been found that the initial incorporation of the urethane linkage into the backbone of the modified polyester allows the formation of more flexible coatings with improved properties, when compared to the prior art coatings discussed above.

Still further, the ability to use of the same coating compositions on metal and plastic components in car production offers distinct commercial advantages, particularly in terms of production efficiency. Additionally, because these coatings can be employed on metal as well as plastic components, the problem of color matching, which must be resolved when using a different coating on the metal and plastic, is eliminated.

BEST MODE FOR CARRYING OUT THE INVENTION

This invention is directed to flexible coating compositions which comprise novel hydroxy-containing urethane modifying polyester crosslinkable with amine-aldehyde crosslinking agent. This coating may be employed as a pigmented or clearcoating on the substrate or may be employed as the pigmented basecoat and/or clearcoat in such basecoat-clearcoat systems.

The hydroxy-containing urethane modified polyester of the coating composition of this invention has a number average molecular weight ($\overline{M}_n$) of between about 1000 and about 10,000, preferably between about 2000 and about 4000. This modified polyester has a hydroxyl number of between about 30 and about 200, preferably between about 50 and about 120. It also contains between about 1 and about 10 urethane groups per molecule. One of the reactants used to form the hydroxy-containing urethane modified polyester is a urethane modified diol which is made by reacting diol and diisocyanate. In forming this urethane modified diol, the diol and the diisocyanate are reacted in a molar ratio of from about 4:1 to about 4:3, preferably in a molar ratio of from about 2:0.8 to about 2:1.2, most preferably in a molar ratio of about 2:1. The diols employed in making the urethane modified diol include, but are not limited to, alkylene glycols, such as butylene glycol, neopentyl glycol, 1,5,pentene glycol, 3-cyclohexene-1,1-dimethynol, and other glycols such as hydrogenated bisphenol A, caprolactone diol (i.e., the reaction product of caprolactone and ethylene glycol), hydroxy alkylated bisphenols, polyether glycols, e.g., poly(oxytetramethylene)glycol, polyester diols, e.g., 2,2-dimethyl-3-hydroxypropyl-2,2-dimethyl-3-hydroxypropionate, and the like. Preferred diols are neopentyl glycol and 2,2-dimethyl-3-hydroxypropyl-2,2-dimethyl-3-hydroxypropionate, the latter material being commercially available as Esterdiol 204 (a trademark of and available from Union Carbide Corp., New York, N.Y.). While a number of types of diols have been mentioned above as suitable for use as the diol component in making the urethane modified diol of this invention, their disclosure is not meant to be limiting. A great many diols are known in the art. Selection of other diols which would be suitable for use in forming the urethane modified diol would be well within the skill of those in the art. Mixtures of diols may also be employed in making the urethane modified diol.

The diisocyanate employed in making the urethane modified diol may be essentially any diisocyanate. Many such organic diisocyanate are known in the art. Suitable diisocyanates include hydrocarbon diisocyanate or substituted hydrocarbon diisocyanate, such as 1,6-hexamethylene diisocyanate, isophorone diisocyanate, p-phenylene diisocyanate, biphenyl diisocyanate, toluene diisocyanate, and 3,3-dimethyl-4,4-biphenylene diisocyanate. While the diisocyanate may be any of a number of aliphatic, cycloaliphatic, and aromatic diisocyanates, it is preferred that the diisocyanate be an aliphatic diisocyanate, such as 4,4-dicyclohexylmethanediisocyanate. As would be apparent to those skilled in the art, mixtures of various diisocyanates may also be employed as the diisocyanate component used in forming the urethane-modifying diol.

The polyol component used in forming the hydroxy-containing urethane modified polyester comprises at least about 5 weight percent triol based on the weight of the polyol component. Preferred triols are conventional low molecular triols such as 1,2,6-hexene triol, 1,1,1-trimethylol propane, pentaerythritol, 3-(2-hydroxypropoxy)-1,2-propanediol and polycaprolactone triols, which are commercially available as, for example, PCP-301 (trademark, Union Carbide Corp., New York, N.Y.). This polyol component may also comprise, in addition to the triol, other polyol material such as diols or tetrol. Preferably however, these other polyols, when employed, consist of diols. Examples of suitable diols which may be included in the polyol component are those which have been disclosed above as suitable for forming the urethane modified diol. Preferred diols for use in the polyol component are linear aliphatic diols. While the polyol component may comprise materials such as diols in addition to the triols, the polyol component may consist essentially of triols. By employing diols in the polyol component in addition to the triols the flexibility of the coating composition is generally increased. Thus selection of the polyol component to be used in forming the hydroxy-containing urethane modified polyester of the composition will be dependent on the particular desired properties and application of the coating composition. When diols are employed in the polyol component, the polyol preferably comprises from about 10 to about 80 weight percent triols and from about 90 to about 20 weight percent diols.

The acid component which is used to form the modified polyester of the composition comprises aliphatic, aromatic, cycloaliphalic dicarboxylic acids or anhydrides thereof. Preferred dicarboxylic acids are the $C_6$–$C_{12}$ acids, which include adipic, azelaic, sebasic, or dodecane dicarboxylic acid, or cyclohexanedicarboxylic acid. More preferably, the dicarboxylic acids employed are aliphatic dicarboxylic acids, most preferably additionally being linear. Mixtures of suitable acids and/or their anhydrides may also be used as the acid component in this invention.

In forming the clearcoat coating compositions of this invention, the diol (a) and the diisocyanate (b) described above are combined and reacted, generally at an elevated temperature, so as to form the urethane modified diol. The ratio of the diol and diisocyanate has been chosen (i.e., a molar excess of diol) so that at the completion of this reaction no free isocyanates are present; the isocyanates having been incorporated into a hydroxy functional material. This urethane modified diol is then combined and reacted with the polyol and acid components, generally in the presence of a catalyst and at elevated temperatures, so as to effect formation of a hydroxy-containing urethane modified polyester. Suitable catalysts for the carboxy/hydroxy condensation reaction include such catalysts as tetraisopropyl titanate, strong acids such as p-toluene sulfonic acid, phosphoric acid, sulfuric acid and materials such as zinc oxide, antimony oxide ($Sb_2O_3$) and sodium acetate. Other catalysts will be apparent to those skilled in the art.

The reactions, whereby the hydroxy-containing urethane modified polyesters are formed, are generally carried out in the presence of solvents commonly employed in coating formulations such as toluene, xylene, methyl amyl ketone, etc.

Another essential component of the coating compositions of this invention is an amine-aldehyde crosslinking agent. Amine-aldehyde crosslinking agents suitable for crosslinking hydroxy functional bearing materials are well known in the art. Typically, these crosslinking materials are product of reactions of melamine, or urea with formaldehyde and various alcohols containing up to and including 4 carbon atoms. Preferably, the amine-aldehyde crosslinking agents useful in this invention are amine-aldehyde resins such as condensation products of formaldehyde with melamine, substituted melamine, urea, benzoguanamine or substituted benzoguanamine. Preferred members of this class are methylated melamine-formaldehyde resins such as hexamethoxymethylmelamine. The particular preferred crosslinkers are the high solids melamine resins which has substantially 100 percent nonvolatile content as measured by the foil method at 45° C. for 45 minutes. For the purposes of the preferred composition of this invention it should be recognized that it is important not to introduce extraneous diluents that lower the final solids content of the coating. Other suitable amine-aldehyde crosslinking agents will be apparent to one skilled in the art. The amine-aldehyde materials function as a crosslinking agent in the compositions of the invention by reacting with the hydroxy functionality of the hydroxy-containing urethane-modified polyester (A) and by reaction with the hydroxy functionality on the linear polyurethane (C), if such materials are included in the composition. The amine-aldehyde crosslinking agent is generally included in the coating composition in an amount of between about 5 and about 60, more preferably between about 20 and about 40 weight percent based on the weight of the hydroxy-containing urethane modified polyester of the composition. Selection of the optimal amount of amine-aldehyde crosslinking agent to be employed in the coating composition is dependent on the desired properties of the coating composition (e.g., flexibility) as well as its intended use. If basecoat/clearcoat systems are employed using embodiments of the composition of the invention of this application for the basecoat and clearcoat, the amount of crosslinker that is employed in each embodiment is individually selected, i.e., the amount of crosslinker in the basecoat and the clearcoat compositions may be similar or be different.

Particular preferred crosslinking agents are the amino crosslinking agents sold by American Cyanamid Company, Wayne, N.J. under the trademark "Cymel". In particular, Cymel 301, 303, 325, 1130, 1156, which are alkalated melamine aldehyde resins are useful in the compositions of this invention. The crosslinking reactions are catalytically accelerated by acids. One such catalyst for example which may be so employed is p-toluene sulfonic acid (PTSA) which, when employed, is generally added to the composition in about 0.5% by weight based on the weight of crosslinking agent and hydroxy-containing modified polyester of the composition.

OPTIONAL MATERIALS

Additional materials which may be employed in the coating compositions of this invention include a high molecular weight linear polyurethane which has a number average molecular weight of between about 15,000 and about 40,000, preferably between about 20,000 and about 30,000. It may be made by reacting one of the above mentioned diisocyanates and diols, such as oligoester diol, polycaprolactone diol, polyoxypropylene diol, polyether diols, etc. Suitable high molecular weight linear polyurethane materials are commercially available, for example, as Spenlite L06-30S, (available from and a trademark of Spencer-Kellogg, Buffalo, N.Y.). The high molecular weight polyurethane may be employed in the composition in amounts up to about 60 weight percent based on the total weight of the hydroxy-containing urethane modified polyester and amine-aldehyde crosslinking agent. When employed, it is preferred that they be included in the composition in amounts of between about 10%–60%, more preferably 30%–50% by weight as described. It has been particularly noted that when the high molecular weight linear urethane is employed in the basecoat of basecoat/clearcoat systems, the depth of the color and metallic glamour of the coatings is improved. While this linear polyurethane, when employed in basecoat/clearcoat systems, is generally preferably only included in the basecoat composition, it may be employed in either or both coats and the amounts employed are independently selected.

It has been noted above that in basecoat/clearcoat systems, the coating compositions of this application may be employed as one or both coatings. In those instances where it is used for both coats of a basecoat/clearcoat system, the basecoat composition and the clearcoat composition may be substantially alike or may be different embodiments of the claimed coating composition as would be dependent on the particular properties and application desired.

In addition to the above discussed components, other materials may be included in the coating compositions of this invention. These include materials such as catalysts, antioxidants, U.V. absorbers, solvents, surface modifiers and whitening agents. Solvents used in the coating composition of this invention are those which are commonly used, e.g., to facilitate spray application at high solids content and include toluene, xylene, methylethyl ketone, acetone, 2-ethoxy-1-ethanol, diacetone alcohol, tetrahydrofuran, ethyl acetate, dimethylsuccinate, dimethylglutarate, dimethyladipate or mixtures thereof. The solvent in which the hydroxy-containing urethane modified polyester is prepared may be employed as a solvent for the composition thus eliminating the need for drying the resin after preparation, if such is desired.

Typical of these ultraviolet stabilizers that are useful in this invention are benzophenones such as dodecyl oxibenzophenone, 2,4-dihydroxybenzophenone, hydroxybenzophenones containing sulfonic groups, 2-4-dihydroxy-3',5'-diteriarybutylbenzophenone, 2,2',4'-trihydroxybenzopheone esters of dicarboxylic acids, 2-hydroxy-4-acryloxyethoxybenzophenone, aliphatic monoesters of 2,2',4-trihydroxy-4'-alkoxybenzophenone; 2-hydroxy-4methoxy-2carboxybenzophenone; triazoles such as 2-phenyl-4-(2',4'-dihydroxybenzoyl)-triazoles substituted benzotriazoles such as hydroxyphenyltriazoles such as 2-(2'-hydroxy-5'-methylphenyl)benzotriazole, 2-(2'-hydroxy-phenyl)benzotriazole, 2-(2'-hydroxy-5'-octylphenyl)naphthatriazole.

Another type of ultraviolet light stabilizer and one that is particularly preferred for use in the coatings of this invention is that taught in concurrently filed U.S. application Ser. No. 553,321, now U.S. Pat. No. 4,480,084 entitled "Polymeric Light Stabilizers" to Kordomenos et al. These stabilizers contain the sterically hindered polyalkylpiperidine radical and at least two primary hydroxyl groups available for crosslinking with the amine-aldehyde component of the coating composition.

Typical of the antioxidants which may be employed in the coating compositions include tetrakis alkylene (di-alkyl hydroxy aryl)alkyl ester alkanes such as tetrakis methylene 3-(3',5'-dibutyl-4'-hydroxyphenyl)proprionate methane, reaction product of p-amino diphenylamine and glycidyl methacrylate, reaction product of n-hexyl-N'-phenyl-p-phenylene diamine and glycidyl methacrylate, pentaerythritol tetrakis(thioglycolate), trimethylol propane tris(thioglycolate), trimethylol ethane tris(thioglycoate), N-(4-anilinophenyl)acrylamide, N-(4-anilinophenyl)maleamic acid, N-(4-anilinophenyl)-maleimide, alkylhydroxyphenyl groups bonded through carboalkoxy linkages to nitrogen atom of a heterocyclic nucleus containing an imidodicarbonyl group or an inidodithiocarbonyl group, 3,3-ditert, butyl-4-hydroxy-cinnamonitrile, ethyl 3,5-ditert, hexyl-4-hydroxy-cinnamate, substituted benzyl esters of B-substituted hydroxyphenyl)propionic acids, bis(hydroxyphenyl alkylene)alkyl isocyanurate compounds, tetrakis hydroxy benzyl phosphonium halides alone or in combination with a dialkylthiodialkanoate, thiodimethylidyne tetrakisphenols alone or in combination with a dialkyl thiodialkanoate or phosphite or phosphonate, dihydrocarbyl-hydroxyphenyl aryl or alkyl phosphonites or phosphonates or phosphates or phosphites or phosphinates or phosphinites or phosphorothionates or phosphinothionates, diphenyl bis(3,5-ditertbutyl-4-hydroxyphenoxysilane, hydrocarbyl-hydroxyphenyl-dihydrocarbyldithio-carbamates such as 3,5-ditertbutyl-4-hydroxy phenyl dimethyldithio carbamate and amino benzyl thioether.

The coating composition may be used as a clear coating on a substrate, e.g., over conventional paints for enhanced gloss or over pigmented plastic substrates as a protective coating. In these instances, the coating composition would preferably include the combination of a benzotriazole such as Tinuvin 328 (a trademark of and commercially available from Ciba-Geigy, Ardsley, N.Y.), and the hindered polymeric amine of the concurrently filed application noted above, and an antioxidant, such as Irganox-1010 (a trademark of and available from Ciba-Geigy). In those instances wherein the coating composition are employed, with modification, as desired, as a basecoat and a clearcoat in a basecoat/clearcoat system, a preferred embodiment of the basecoat would preferably contain only a U.V. stabilizer such as Tinuvin 328 and the clearcoat would contain a benzotriazole, e.g., Tinuvin 328, the polymeric hindered amine light stabilizer of the aforemention application to Kordomenos et al and an antioxidant, e.g., Irganox-1000 (trademark, Ciba-Geigy). While several applications of the coating composition of this invention have been proposed, e.g., as primers, clearcoats, etc., they are not meant to be limiting. Additionally, while preferred embodiments of stabilizers and antioxidants have been taught, they are not meant to be limiting.

Surface modifiers or wetting agents are common additives for liquid paint compositions. Exact mode of operation of these surface modifiers is not known but it is thought that their presence contributes to better adhesion of coating compositions to the surface being coated and helps formation of thin coatings, particularly on metal surfaces. The choice of surface modifiers or wetting agents is dependent upon the type of surface to be coated. Selection of appropriate surface modifiers will be well within the skill of the artesian. Typical of these surface modifiers are polybutyl acrylate and a wide variety of silicon wetting agents which are commercially available.

For many applications of the coating compositions of the invention, particularly high solids compositions, it may be desirable to employ flow control additives to provide sag free coatings. Among numerous such materials, NAD's such as described by Porter (S. Porter, Jr., and B. N. McBane, U.S. Pat. No. 4,025,474, May 24, 1977) are compatible with these coating compositions. These particle dispersions may be included generally in an amount up to 15% by weight of the total composition. Other types of NAD's such as described by D. L. Maker and S. C. Peng (U.S. Pat. No. 3,814,721, June 4, 1974) or by S. K. Horvath (U.S. application Ser. No. 292,853, filed Aug. 14, 1981, now abandoned) also may be included in the coating composition.

The coating composition of the invention may also include pigments. The optimal amount of pigment which may be included would be dependent on the particular use of the coating composition as is apparent to one skilled in the art. For example, primers generally contain higher levels of pigment as compared to basecoats of basecoat/clearcoat systems and conventional enamels. Selection of the optimal amount of pigment to be included in the composition would be dependent, e.g., the desired hiding requirements. On the other hand, the clearcoat of such systems is essentially free of pigments.

The coating composition can be applied by conventional methods known to those in the art. These methods include roll coating, spray coating, dipping or brushing and of course the particular application technique chosen with the particular substrate to be coated and the environment in which coating operation takes place.

Particular preferred techniques for applying these coating compositions, particularly when applying the same to automobiles, is spray coating through the nozzle of the spray gun.

INDUSTRIAL APPLICABILITY

It will be apparent from the foregoing that this invention has industrial applicability to automotive vehicles and provides a flexible, durable coating for metal and plastic substrates.

The invention will be further understood by referring to the following detailed examples. It should be understood that the specific examples are presented by way of illustration and not by way of limitation. Unless otherwise specified, all references to "parts" is intended to mean parts by weight.

EXAMPLE I

In a suitable reactor 562 gms of Esterdiol-204 (trademark of Union Carbide), 360 gms of xylene were charged. The mixture was brought to 149° C. and any water present was stripped out. The temperature was lowered to 93° C. and 360 gms of Desmondur W (trademark of Mobay Chemical Co., Pittsburg, Pa.) were added dropwise in a period of one hour. After the end of the addition, the mixture was postreacted at 93° C. until no NCO group was observed in an infrared spectrum. At this point, 240 gms of PCP-0301 (polycaprolactone triol, trademark of Union Carbide) 263 gms of adipic acid, 3 gms of dibutyl tin oxide, and 215 gms of xylene were added. The mixture was heated up to 204° C. and water was distilled off until the acid number dropped below 10. The batch was then thinned with 480 parts of methyl amyl ketone. The final product had $Z_3$ viscosity at 70.8% NV and acid number 1.2.

EXAMPLE I'

In a suitable reactor 562 gms of Esterdiol-204 (trademark of Union Carbide) and 360 gms of xylene were charged. The mixture was brought to reflux (149° C.) and any water present was stripped out. The temperature was lowered to 93° C. and 360 gms of Desmondur W (trademark of Mobay Chemical Co.) was added dropwise in a period of one hour. After the end of the addition, the mixture was postreacted at 93° C. until no NCO group was observed in an IR spectrum. At this point, 240 gms of PCP-0301 (polycaprolactone triol, trademark of Union Carbide, New York, N.Y.) 131 gms of adipic acid and 133 gms of phthalic anhydride, 3 gms of dibutyl tin oxide, and 215 gms of xylene were added. The mixture was heated up to 204° C. and water was distilled off until the acid number dropped below 10. The batch was then thinned with 480 parts of methyl amyl ketone. The final product had $Z_5$ viscosity at 70.1% NV and acid number 3.

EXAMPLE II

In a suitable reactor 314 gms of Esterdiol-204 (trademark, Union Carbide) and 175 gms of xylene were charged. The mixture was brought to reflux (149° C.) and any water present was stripped out. The temperature was lowered to 93° C. and 202 gms of Desmondur W (trademark, Mobay Chemical Co.) were added dropwise in a period of one hour. After the end of the addition, the mixture was postreacted at 93° C. until no NCO group was observed in an IR spectrum. At this point, 359 gms of Esterdiol-204 (trademark, Union Carbide) 441 parts of PCP-0301 (trademark, Union Carbide), 482 gms of adipic acid, 250 gms of xylene, and 3 gms of dibutyl tin oxide were charged. The mixture was heated up to 204° C. and water was distilled off until the acid number dropped below 10. The batch was then thinned at 478 gms of methyl amyl ketone. The final product had a viscosity of $X\frac{1}{2}$ at 70.1% NV and 0.9 acid number.

EXAMPLE III

In a suitable reactor 562 gms of Esterdiol-204 (trademark of Union Carbide) and 360 gms of xylene were charged. The mixture was brought to reflux (149° C.) and any water present was stripped out. The temperature was lowered to 93° C, and 300 gms of isophorone diisocyanate was added dropwise in a period of one hour. After the end of the addition, the mixture was postreacted at 93° C. until no NCO group was observed in an IR spectrum. At this point, 240 gms of PCP-0301 (polycaprolactone triol, trademark of Union Carbide) 263 gms of adipic acid, 3 gms of dibutyl tin oxide, and 215 gms of xylene were added. The mixture was heated up to 204° C. and water was distilled off until the acid number dropped below 10. The batch was then thinned with 480 parts of methyl amyl ketone. The final product had Y viscosity at 72% NV and acid number 7.9.

EXAMPLE IV

In a suitable reactor 286 gms of neopentyl glycol and 360 gms of xylene were charged. The temperature was raised to 93° C. and 360 gms of Desmondur-W (trademark of Mobay Chemical Co.) was added dropwise in a period of one hour. After the end of the addition, the mixture was postreacted at 93° C. until no NCO group was observed in an IR spectrum. At this point, 240 gms of PCP-0301 (polycaprolactone triol, trademark of Union Carbide) 263 gms of adipic acid, 3 gms of dibutyl tin oxide, and 215 gms of xylene were added. The mixture was heated up to 204° C. and water and xylene was distilled off until the acid number dropped below 10. The batch was then thinned with 480 parts of methyl amyl ketone. The final product had $Z_4$ viscosity 71.7% NV and acid number 0.8.

EXAMPLE V

In a suitable reactor 281 gms of Esterdiol-204 (trademark of Union Carbide), 728 gms of PCP-0200 (polycaprolactone diol, trademark of Union Carbide) and 360 gms of xylene were charged. The mixture was brought to reflux (149° C.) and any water present was stripped out. The temperature was lowered to 93° C. and 360 gms of Desmondur-W (trademark of Mobay Chemical Co.) was added dropwise in a period of one hour. After the end of the addition, the mixture was postreacted at 93° C. until no NCO group was observed in an IR spectrum. At this point, 108 gms of trimethylol propane, 263 gms of adipic acid, 3 gms of dibutyltin oxide, and 200 gms of xylene were added. The mixture was heated up to 204° C. and water and xylene was distilled off until the acid number dropped below 10. The batch was then thinned with 400 parts of methyl amyl ketone. The final product had $Z_1$ viscosity at 72.7% NV and acid number 2.0.

EXAMPLE VI

In a suitable reactor 562 gms of Esterdiol-204 (trademark of Union Carbide) and 360 gms of xylene were charged. The mixture was brought to reflux (149° C.) and any water present was stripped out. The temperature was lowered to 93° and 360 gms of Desmondur W (trademark of Mobay Chemical Co.) was added dropwise in a period of one hour. After the end of the addition, the mixture was postreacted at 93° C. until no NCO group was observed in an IR spectrum. At this point, 108 gms of trimethylol propionic acid and 108 gms of dimer acid (Empol 1016, Enery, Ind.) 3 gms of dibutyl tin oxide, and 200 gms of xylene were added. The mixture was heated up to 204° C. and water and xylene was distilled off until the acid number dropped below 10. The batch was then thinned with 400 parts of methyl amyl ketone. The final product had X+ viscosity at 69.2% NV and acid number 2.9.

EXAMPLE VII

In a suitable reactor 753 gms of Esterdiol-204 (trademark of Union Carbide) and 360 gms of xylene were charged. The mixture was brought to reflux (149° C.) and any water present was stripped out. The temperature was lowered at 93° C. and 360 gms of Desmondur W (trademark of Mobay Chemical Co.) was added dropwise in a period of one hour. After the end of the addition, the mixture was postreacted at 93° C. until no NCO group was observed in an IR spectrum. At this point, 474 gms of PCP-0301 (polycaprolactone triol, trademark of Union Carbide) 263 gms of adipic acid, 402 gms of dodecanoic acid, 4 gms of dibutyl tin oxide, and 200 gms of xylene were added. The mixture was heated up to 204° C. and water and xylene was distilled off until the acid number dropped below 10. The batch was then thinned with 480 parts of methyl amyl ketone. The final product had $Z_1$ viscosity at 70.0% NV and acid number 5.2.

EXAMPLE VIII

In a suitable reactor 649 gms of Esterdiol-204 (trademark of Union Carbide) and 300 gms of xylene were charged. The mixture was brought to reflux (149° C.) and any water present was stripped out. The temperature was lowered to 93° C. and 276 gms of toluene diisocyanate (TDI, 80/20, 2,4/2,6 isomers) was added dropwise in a period of one hour. After the end of the addition, the mixture was postreacted at 93° C. until no NCO group was observed in an IR spectrum. At this point, 240 gms of trimethylol propane, 263 gms of adipic acid, 3 gms of dibutyl tin oxide, and 200 gms of xylene were added. The mixture was heated up to 204° C. and water and xylene was distilled off until the acid number dropped below 10. The batch was then thinned with 480 parts of methyl amyl ketone. The final product had Y+ viscosity at 74.5% NV and acid number 1.3.

EXAMPLE IX

In a suitable reactor 136 gms of propylene glycol, 172 gms of adipic acid and 66.4 gms of toluene were added. The mixture was heated up to reflux and 42.6 gms of water were stripped out. At this point 321 gms of oligo-ester made according to Example 1 of U.S. Pat. No. 4,322,508 to Peng et al, 250 gms of toluene, 10 gms of dibutyl tin dilaurate were added. In a period of 3 hours, 396 parts of Desmodur W (trademark, Mobay Chemical co.) were added. During the addition, the temperature was allowed to rise from 116° C. to 143° C. The mixture was kept at this temperature until no NCO groups were observed in an IR spectrum. The batch was thinned with 860 gms of toluene and 1,260 gms isopropanol. The final product had a W viscosity at 33.1% NV.

EXAMPLE X–XII″

Flexible basecoat compositions were formulated according to the following table:

| Clearcoat Compositions | | | | | | | |
|---|---|---|---|---|---|---|---|
| Composition/Example | XIII | XIV | XV | XVI | XVII | XVIII | XIX |
| Resin of Example I | 414 | | | | | | 97 |
| Resin of Example II | | 250 | | | | | |
| Resin of Example III | | | 398 | | | | |
| Resin of Example IV | | | | 400 | | | |
| Resin of Example V | | | | | 394 | | |
| Resin of Example VI | | | | | | 414 | |
| Resin of Example VII | | | | | | | |
| Cymel 1130[1] | 95 | 58 | 95.6 | 95 | 95 | 95 | 127 |
| Tinuvin 328[2] | 5.8 | 3.6 | 6 | 6 | 6 | 6 | 5.3 |
| 2-ethyl hexanol | 11.5 | 7.6 | 12.5 | 12.5 | 12.5 | 12.5 | 11 |
| methanol | 4.3 | 26.3 | 41 | 43 | 43 | 43 | 40 |
| methyl amyl ketone | 131 | 80 | 304 | 304 | 304 | 304 | 60 |
| PTSA (40%) | 8.3 | 3.2 | 5.3 | 5.3 | 5.3 | 5.3 | 7.1 |
| Irganox 1010[3] | 0.78 | 0.47 | 0.78 | 0.78 | 0.78 | 0.78 | |

The above compositions were reduced to 30 sec. viscosity at #4 Ford Cup with methyl amyl ketone.
[1]Trademark, American Cyanamid Co
[2]Trademark, Ciba-Geigy
[3]Trademark, Ciba-Geigy (Antioxidant)

Example XX–XVIII
The following basecoat/clearcoat combinations were sprayed over metal and plastic substrates and cured at 121° C. for 30 minutes.

| Coating Composition | XX | XXI | XII | XIII | XXIV | XXV | XXVI | XVII | XVIII | XVIII |
|---|---|---|---|---|---|---|---|---|---|---|
| Basecoat of Example | X | XI | XII | X | X | X | X | X | X | XII″ |
| Clearcoat of Example | XIII | XIII | XIII | XIV | XV | XVI | XVII | XVIII | XIX | XIII |
| % elongation | 100 | 60 | 85 | 60 | 85 | 110 | 75 | 100 | 95 | 50% |
| MEK resistance (100 rubs) | Excell | Excell | Excell | Excell | Excell | Excell | Excell | Excell | Excell | Excell |
| QUV (1000 hrs.) | Excell | Excell | Excell | Excell | Excell | Excell | Excell | Excell | Excell | Excell |

| Compositions/Example | X | XI | XII | XII′ | XII″ |
|---|---|---|---|---|---|
| Resin of Example I | 50 | | | | |
| Resin of Example I′ | | | | | 50 |
| Resin of Example II | | 93 | | | |
| Resin of Example III | | | 50 | | |
| Resin of Example IX | | | 100 | | |
| Resin of Example IV | | | | 57 | |
| Spenlite L06-30S[1] | 100 | | | 50 | 100 |
| Cymel 1130[2] | 46 | 46 | 46 | 46 | 46 |
| Tin-328[3] | 3.6 | 3.6 | 3.6 | 3.6 | 3.6 |
| PTSA (40%) | 1.5 | 1.5 | 1.5 | 1.5 | 1.5 |
| 5000-AR[4] | 50 | 50 | 50 | 50 | 50 |
| Xylene | 75 | 75 | 75 | | 75 |
| Isopropyl alcohol | 75 | 75 | 75 | 75 | 75 |
| Surfynol-104[5] | 6 | 6 | 6 | 21 | 6 |
| Methyl amyl ketone | | | | 100 | 100 |

[1]Trademark of Spencer-Kellogg
[2]Trademark, American Cyanamid Co. (highly methylated melamine formaldehyde resin)
[3]Trademark, Ciba-Geigy
[4]Aluminum Paste, purchased Siberline, Laneford, Pa.
[5]Trademark, Air Products & Chemicals, Inc., Allentown, Pa., (surfactant; 2,4,7,9-tetramethyl).

The above basecoats were reduced to 20 sec. at #4 Ford Cup with methyl amyl ketone before spraying.

EXAMPLE XXIX

A millbase was prepared by grinding in a ballmill the following mixture:

| Composition | Parts |
|---|---|
| Resin of Example VIII | 101 |
| 2-ethyl hexanol | 21 |
| Toluene | 50 |
| Anti-Terra-V | 19 |
| Barium sulfate | 547 |
| TiO$_2$ | 103 |
| Carbon black | 4 |
| Strontium chromate | 33 |
| Xylene | 117 |

A high solids primer coating composition was formulated by mixing the following components:

| Composition | Parts |
|---|---|
| Millbase (above) | 82 |
| Resin of Example VIII | 32 |
| Cymel 1130[1] | 11 |
| PTSA (40% sol) | 1.2 |
| n-butyl alcohol | 100 |

[1]Trademark, American Cyanamid.

The above composition was reduced to 20 sec. #4 Ford Cup at 80° C. with methyl amyl ketone. Unpolished banderite steel panels and plastic panels were sprayed and baked for 30 min. at 250° C. to give smooth, tough films with good MEK resistance.

EXAMPLE XXX

Into a steel ball mill the following pigment paste was ground.

| Composition | Parts |
|---|---|
| n-butyl alcohol | 100 |
| Cymel 1130[1] | 100 |
| Nuosperse 700[2] | 10 |
| $TiO_2$[3] | 600 |
| Resin of Example I | 75 |
| Methyl amyl ketone | 115 |
| Enamel Composition | |
| Above millbase | 324 |
| Resin of Example I | 262 |
| Cymel 1130 | 38 |
| n-butyl alcohol | 136 |
| 2-ethyl hexanol | 49 |
| Methyl amyl ketone | 140 |
| Tinuvin-328[4] | 4 |
| Polymeric hindred amine | 4 |
| Irganox 1010[5] | 0.5 |
| Polybutyl acrylate | 0.8 |
| PTSA (40% sol) | 7 |

[1]Trademark, American Cyanamid
[2]Dispersing agent available from Tommelo Chem.
[3]R960HG supplied by Dupont
[4]Trademark, Ciba-Geigy
[5]Trademark, Ciba-Geigy (Antioxidant)

The above composition was reduced to 18 sec., #4 Ford Cup at 80° C. with methyl amyl ketone. Plastic panels were sprayed and cured at 121° C. for 30 min. The resulting coating had a smooth appearance, good MEK resistance and when tested for flexibility had an elongation of 90%.

While particular embodiments of the invention have been described, it will be obvious to those skilled in the art that various changes and modifications may be made without departing from the invention, and it is intended to cover in the appended claims all such modifications and equivalents as fall within the true spirit and scope of this invention.

What is claimed is:

1. A flexible coating composition which is characterized in that it comprises:
(A) hydroxy-containing urethane modified polyester (i) having a number average molecular weight ($\overline{M}_n$) of between about 1000 and about 10,000, (ii) having a hydroxyl number of between about 30 and about 200, and (iii) containing between about 1 and about 10 urethane groups per molecule, and being made from reactants comprising:
  (1) urethane modified diol made by reacting:
    (a) a diol, and
    (b) diisocyanate,
    wherein said diol and said diisocyanate are reacted in a molar ratio of from about 4:1 to about 4:3;
  (2) polyol comprising at least about 5 weight percent triol; and
  (3) acid component selected from dicarboxylic acids and anhydrides thereof;
(B) amine-aldehyde crosslinking agent; and
(C) 0-60 weight percent, based on the total weight of (A) and (B) of said composition, of a linear polyurethane having a number average molecular weight of between about 15,000 and about 40,000.

2. A flexible coating composition according to claim 1, wherein said hydroxy-containing urethane modified polyester has a number average molecular weight of between about 2000 and about 4000.

3. A flexible coating composition according to claim 1, wherein said hydroxy-containing urethane modified polyester has a hydroxyl number of between about 50 and 120.

4. A flexible coating composition according to claim 1, wherein said urethane modified diol is made by reacting said diol and said diisocyanate in a molar ratio from about 2:0.8 to about 2:1.2.

5. A flexible coating composition according to claim 1, wherein said polyol further comprises diol.

6. A flexible coating composition according to claim 5, wherein said polyol comprises about 10–80 weight percent triol and about 90–20 weight percent diol based on the weight of said polyol.

7. A flexible coating composition according to claim 5, wherein said polyol comprises diol which is an aliphatic, linear diol.

8. A flexible coating composition according to claim 1, wherein said dicarboxylic acids comprise $C_6$–$C_{12}$ aliphatic, dicarboxylic acids.

9. A flexible coating composition according to claim 1, wherein said amine-aldehyde crosslinking agent is included in said composition in an amount of from about 5 to about 60 weight percent based on the weight of said hydroxy-containing urethane modified polyester in said composition.

10. A flexible basecoat/clearcoat coating composition useful as automotive finish coats on metal and plastic substrates which is characterized in that the basecoat composition and the clearcoat composition each independently comprises:
(A) hydroxy-containing urethane modified polyester (i) having a mumber average molecular weight ($\overline{M}_n$) of between about 1000 and about 10,000, (ii) having a hydroxyl number of between about 30 and about 200, and (iii) containing between about 1 and about 10 urethane groups per molecule, and being made from reactants comprising:
  (1) urethane modified dil made by reacting:
    (a) diol, and
    (b) diisocyanate,
    wherein said diol and said diisocyanate are reacted in a molar ratio of from about 4:1 to about 4:3;
  (2) polyol comprising at least about 5 weight percent triol; and
  (3) acid component selected from dicarboxylic acids and anhydrides thereof;
(B) amine-aldehyde crosslinking agent; and
(C) 0-60 weight percent, based on the total weight of (A) and (B) of each composition, of a linear polyurethane having a number average molecular weight of between about 15,000 and about 40,000 and wherein said basecoat further comprises pigment.

11. A flexible basecoat/clearcoat coating composition according to claim 10, wherein said hydroxy-containing urethane modified polyester of said basecoat or said clearcoat composition has a number average molecular weight of between about 2000 and about 4000.

12. A flexible basecoat/clearcoat coating composition according to claim 10, wherein said hydroxy-containing urethane modified polyester of said basecoat or said clearcoat composition has a hydroxyl number of between about 50 and 120.

13. A flexible basecoat/clearcoat coating composition according to claim 10, wherein said urethane modified diol of said baecoat or clearcoat composition is made by reacting said diol and said diisocyanate in a molar ratio of from about 2:0.8 and about 2:1.2.

14. A flexible basecoat/clearcoat coating composition according to claim 10, wherein said polyol of said basecoat or said clearcoat composition further comprises diol.

15. A flexible basecoat/clearcoat coating composition according to claim 14, wherein said polyol comprises about 10–80 weight percent triol and about 90–20 weight percent diol based on the weight of said polyol.

16. A flexible basecoat/clearcoat coating composition according to claim 14, wherein said polyol comprises diol which is an aliphatic, linear diol.

17. A flexible basecoat/clearcoat coating composition according to claim 10, wherein said dicarboxylic acids of said basecoat or said clearcoat composition comprise $C_6$–$C_{12}$ aliphatic, linear dicarboxylic acid.

18. A flexible basecoat/clearcoat coating composition according to claim 10, wherein said decomposition comprises between about 10 and about 60 weight, based on the total weight of (A) and (B) of said composition, of said linear polyurethane.

19. A flexible basecoat/clearcoat coating composition according to claim 1, wherein said amine-aldehyde crosslinking agent is included in the composition in an amount of from about 5 and about 60 weight percent based on the weight of said urethane modified polyester in said composition.

* * * * *

UNITED STATES PATENT AND TRADEMARK OFFICE
CERTIFICATE OF CORRECTION

PATENT NO. : 4,524,192

DATED : June 18, 1985

INVENTOR(S) : Delores J. Alexander et al

It is certified that error appears in the above-identified patent and that said Letters Patent are hereby corrected as shown below:

On the cover sheet, following item [76], insert the paragraph:

-- [73] Assignee: Ford Motor Company, Dearborn, Mich.--

Signed and Sealed this

Twenty-fourth Day of December 1985

[SEAL]

Attest:

DONALD J. QUIGG

Attesting Officer

Commissioner of Patents and Trademarks